United States Patent [19]

Moyer et al.

[11] Patent Number: 5,411,301
[45] Date of Patent: May 2, 1995

[54] TUBING CONNECTION WITH EIGHT ROUNDED THREADS

[75] Inventors: Mark C. Moyer, Missouri City; James P. Powers; Rick A. Ashley, both of Houston, all of Tex.

[73] Assignee: Exxon Production Research Company, Houston, Tex.

[21] Appl. No.: 158,835

[22] Filed: Nov. 24, 1993

Related U.S. Application Data

[63] Continuation of Ser. No. 723,282, Jun. 28, 1991.

[51] Int. Cl.⁶ ............................................. F16L 25/00
[52] U.S. Cl. ................................... 285/333; 285/94; 285/55; 285/328; 285/355
[58] Field of Search ............... 285/333, 334, 355, 390, 285/55, 94, 328; 403/343

[56] References Cited

U.S. PATENT DOCUMENTS

| | | | |
|---|---|---|---|
| 1,394,791 | 10/1921 | Runyan | 285/333 X |
| 2,532,632 | 12/1950 | MacArthur | 285/146 |
| 2,909,380 | 10/1959 | Hoye et al. | 285/333 |
| 3,346,278 | 10/1967 | Yocum | 285/333 |
| 3,497,246 | 2/1970 | Weiner | 285/333 |
| 3,811,710 | 5/1974 | Dula et al. | 285/55 |
| 4,004,832 | 1/1977 | Connelly | 285/333 |
| 4,121,862 | 10/1978 | Greer | 285/333 |
| 4,127,927 | 12/1978 | Hauk et al. | 29/407 |
| 4,813,717 | 3/1989 | Watts | 285/333 |
| 4,830,411 | 5/1989 | Tsuru et al. | 285/334 |
| 4,852,655 | 8/1989 | Guy | 166/380 |
| 4,893,658 | 1/1990 | Kimura et al. | 138/109 |
| 4,969,671 | 11/1990 | Gross et al. | 285/355 |

OTHER PUBLICATIONS

Guide To World Screw Threads Industrial Press Inc. 200 Madison Ave, N.Y. N.Y. p. 122.
API Specification Std. 5B, American Petroleum Institute, 13th Edition, May 31, 1988, p. 11, Tables 2.5 and 2.6.
Report of American Production of Casing, Tubing and Drill Pipe for 1990, American Petroleum Institute, Issued Dec. 1991, p. 7.
Report of Foreign Production of Casing, Tubing and Drill Pipe for 1990, American Petroleum Institute, Issued Dec. 1991, p. 7.
Report of European Production of Casing, Tubing and Drill Pipe for 1990, American Petroleum Institute, Issued Dec. 1991, p. 10.
VAM PTS Company—Catalog No. 850, No date lised, pp. 4 and 5.
AMF Tuboscope Inc.—1984 Catalog, 1984, p. 1.

*Primary Examiner*—Dave W. Arola
*Attorney, Agent, or Firm*—Kelly A. Morgan

[57] ABSTRACT

A non-upset tubing section, a tubular coupling, a connection for non-upset tubing sections, and a method for connecting the non-upset tubing section and the tubular coupling are disclosed. Methods for fabricating the non-upset tubing section and the tubular coupling are also disclosed. In one embodiment, the non-upset tubing section has an outer diameter of about $2\frac{3}{8}$ inches and, in another embodiment has an outer diameter of about $2\frac{7}{8}$ inches. The non-upset tubing section also has an externally tapered threaded surface having approximately eight rounded threads per linear inch. The tubular coupling has an outer diameter of about $2\frac{7}{8}$ inches, for use with at least one $2\frac{3}{8}$ inches OD tubing section, or about $3\frac{1}{2}$ inches, for use with at least one $2\frac{7}{8}$ inches OD tubing section. The coupling also has an internally tapered threaded surface having approximately eight rounded threads per linear inch and having a pitch diameter of about 2.258 inches for use with the $2\frac{3}{8}$ inches OD tubing section or about 2.729 inches for use with the $2\frac{7}{8}$ inches OD tubing section; Each pitch diameter is measured at a plane located about 1.250 inches from a plane located at a face of the coupling. To connect the non-upset tubing section with the tubular coupling, a thread compound is applied to either or both the threaded surface of the non-upset tubing section and the threaded surface of the tubular coupling. The non-upset tubing section is then inserted into one end of the coupling, and either the tubing section or the coupling is turned relative to its mating part until the non-upset tubing section and coupling reliably connect and seal.

26 Claims, 2 Drawing Sheets

TUBING CONNECTION WITH EIGHT ROUNDED THREADS

This application is a continuation application of co-pending application Ser. No. 07/723,282, filed on Jun. 28, 1991.

FIELD OF THE INVENTION

The present invention relates to tubing and tubing connections used in drilling and production from oil and gas reservoirs. In one aspect, the present invention relates to non-upset tubing sections, a coupling for joining non-upset tubing sections and a method for joining the non-upset tubing sections.

BACKGROUND OF THE INVENTION

In operations related to the drilling and production of oil and gas from underground reservoirs, sections of tubing which are connected together with fluid-tight reliable seals are used to form a conduit for production of the reservoir fluids (liquid or gas) to the surface. Generally, in the oil and gas industry, threaded connections are often used to connect the tubing sections. Each tubing connection usually has at least one tapered exteriorly-threaded end called a "pin" and a relatively short coupling with two interiorly-threaded ends called "boxes". The pin section is inserted into the box and the "connection" thus made is assembled in a rotational manner, or "made-up", to effectively connect the tubing sections and seal the connection.

The connections (which as described above will include the pin(s) and coupling) for the tubing sections must be manufactured in accordance with certain specifications and tolerances to withstand and carry various loads and to maintain a fluid-tight seal under considerable pressure; the connections will be exposed to torsional forces which arise from making-up or assembling the connection. In addition, the tubing string is usually under pressure resulting from external and/or internal fluids and under axial tension or compression loads caused by the weight of the tubing string hanging in the well. As a result, considerable loads are imposed on the connections between tubing sections which may cause leakage of production fluids from the connections, deformation or galling of the threads of the connections, or separated or split connections.

For relatively moderate depth (less than 10,000 ft), low to moderate pressure (less than 5000 psi) operations, tubing ranging in outer diameter ("OD") from about 1 inch to about 4½ inches can be used to produce oil and gas from a reservoir; however, the great preponderance of such oilfield applications use tubing having an OD of about 2⅜ inches or about 2⅞ inches, where the tubing is either non-upset tubing or upset-end tubing. Non-upset tubing is pipe in which the wall thickness and outside diameter in the area of the threads are not increased over the wall thickness and outside diameter of the pipe body, whereas, as described further below, externally upset-end tubing ("upset-end tubing") is pipe in which the wall thickness and outside diameter in the area of the threads are increased. When the threads are cut on the end of the non-upset tubing section, commonly referred to as the pin-end, the cross-sectional area of the tubing body beneath the threads is reduced and hence the axial strength of the connection may be less than that of the tubing body. This reduction in cross-sectional area of the non-upset tubing body is an important factor to be considered when determining what type of thread should be used; however, this strength reduction is not necessarily a hindrance for moderate depth, low to moderate pressure applications.

Connections most often used by the petroleum industry are manufactured in accordance with specifications and tolerances provided by the American Petroleum Institute. These are referred to as "API" connections. For non-upset tubing having an OD of about 2⅜ inches or about 2⅞ inches, the existing API specification teaches use of a "10-round" (ten rounded threads per linear inch) threaded connection design, which is a relatively fine and shallow-cut thread. This thread is often too fragile for oilfield handling and is not a popular choice due to its propensity to cross-thread and otherwise become damaged during make-up and break-out operations. As a consequence, for most oil field operations, non-upset tubing having an OD of about 2⅜ inches or about 2⅞ inches with 10-round threads is seldom used. A typical 10-round thread is dimensionally described in Table 2.9 of API specification STD 5B (thirteenth edition, May 31, 1988).

Because of the problems associated with the 10-round thread connection for non-upset tubing having an OD of about 2⅜ inches or about 2⅞ inches, an upset-end tubing connection is normally used instead. Generally, with an upset-end tubing connection, to maintain a connection at least as strong as the tubing body, the OD of one end of the tubing is increased by thermally and mechanically upsetting the tube end, which increases the cross-sectional wall thickness and also the outer diameter of the tube end in preparation for thread cutting. Because of the increased wall thickness, the axial strength of the connection is typically greater than that of the tubing body.

The existing API specification (STD 5B) for upset-end tubing connections with tubing having an OD of about 2⅜ inches or about 2⅞ inches teaches use of an "8-round" thread form (eight rounded threads per linear inch), which is a taller thread and is more sturdy than the 10-round thread and is well accepted in the oil field due to its rugged characteristics. However, the API specifications do not teach the use of an 8-round thread form with non-upset tubing having an OD of about 2⅜ inches or about 2⅞ inches.

Although the API Specification (STD 5B) teaches the use of the rugged 8-round thread form with upset-end tubing, there are problems associated with the upsetting process; it is complex and time-consuming and furthermore requires subsequent heat treatment to restore the upset region to its original strength and ductility. The upsetting operation can introduce thermal cracks and internal irregularities which can render subsequent internal coatings ineffective against corrosion and even lead to downhole failures. The upsetting operation requires an extra inspection process just to cull out the thermally-cracked tubulars. These additional processing steps and precautions, which are not required for non-upset tubing, can add at least 10% to the total cost of the tubing. Furthermore, when upsetting welded tubulars (i.e., tubulars which are created by rolling a steel plate into a circle and welding longitudinally), the upsetting process becomes even more complex and expensive because additional precautions must be taken. Welded tubulars are usually less expensive than seamless pipe, yet the additional precautions which must be taken when upsetting welded tubulars will often offset these cost advantages. Accordingly, if a connection design does not require the upsetting process (which, as set forth above, can add at least 10% to the total cost of the tubing), tubular costs could be reduced another 10% to 30% by using seam-annealed, electric resistance welded (ERW) pipe rather than seamless pipe. In addition to the foregoing problems related to the upsetting operation, an upset tubing end can only be rethreaded two or three times because of the limited length of the upset-end, whereas a non-upset tubing section can be rethreaded 10 or 20 times until the tubing is too short to be useful.

In view of the foregoing, there is a need for rugged low-cost tubing connections for use with non-upset tubing having an outer diameter of about 2⅜ inches or about 2⅞ inches.

SUMMARY OF THE INVENTION

The various embodiments of the present invention include a non-upset tubing section, a tubular coupling, methods for fabricating the non-upset tubing section and tubular coupling, a connection for non-upset tubing sections, and a method for connecting the non-upset tubing section(s) with the tubular coupling.

In one embodiment, the non-upset tubing section of the present invention has an outer diameter ("OD") of about 2⅜ inches (a "2⅜ inches OD tubing section"), and in another embodiment the non-upset tubing section has an OD of about 2⅞ inches (a "2⅞ inches OD tubing section"). Each non-upset tubing section also has an externally tapered threaded surface on at least one end (the "pin-end"). The externally tapered threaded surface has approximately eight rounded threads per linear inch and has a pitch diameter of about 2.314 inches for the 2⅜ inches OD tubing section or about 2.771 inches for the 2⅞ inches OD tubing section, where the pitch diameter for both sections is measured at a plane located about 1.250 inches from a plane located at the end of the nose of the pin-end of the tubing section. The method for making the non-upset tubing section comprises fabricating an externally tapered threaded surface on at least one end of the non-upset tubing section such that the threaded surface has approximately eight rounded threads per linear inch and a pitch diameter as described above.

The tubular coupling of the present invention has an outer diameter of about 2⅞ inches (a "2⅞ inches OD coupling") for use with a 2⅜ inches OD tubing section or about 3½ inches (a "3½ inches OD coupling") for use with a 2⅞ inches OD tubing section. The coupling also has an internally tapered threaded surface with approximately eight rounded threads per linear inch and with a pitch diameter of about 2.258 inches for use with a 2⅜ inches OD tubing section or about 2.729 inches for use with a 2⅞ inches OD tubing section, where the pitch diameter is measured at a plane located about 1.250 inches from a face of the coupling. The method for making a tubular coupling comprises forming an internally tapered threaded surface within the coupling such that the threaded surface has approximately eight rounded threads per linear inch and a pitch diameter as described above.

The connection for non-upset tubing section(s) of the present invention comprises (a) at least one non-upset tubing section having an OD of about 2⅜ inches or about 2⅞ inches and having an externally tapered threaded surface with approximately eight rounded threads per linear inch and (b) a tubular coupling having two box-ends and an OD of about 2⅞ inches for use with a 2⅜ inches OD tubing section or about 3½ inches for use with a 2⅞ inches OD tubing section. Each of the box-ends has an internally tapered threaded surface with approximately eight rounded threads per linear inch and with a pitch diameter of about 2.258 inches for use with a 2⅜ inches OD tubing section or of about 2.729 inches for use with a 2⅞ inches OD tubing section, where the pitch diameter is measured at a plane located about 1.250 inches from a plane located at a face of the coupling. These dimensions allow the internally threaded surface of the coupling to mate and reliably seal at either box-end with the externally tapered threaded surface of the pin-end of the non-upset tubing section.

The method for connecting the non-upset tubing section(s) with the tubular coupling comprises applying a thread compound or lubricant to the threaded surfaces of either, or both, the tubing section or the coupling. The pin-end of the non-upset tubing section is then inserted into one box-end of the tubular coupling and either the non-upset tubing section or the tubular coupling is turned relative to its mating part (i.e. the coupling or the tubing section, respectively) until the non-upset tubing section and the tubular coupling reliably connect and seal.

The various embodiments of the present invention incorporate the widely accepted benefits of an 8-round thread form, but do not have the problems and increased costs associated with upset-end tubing connections; the embodiments of the present invention do not require upsetting, can be used on low-cost ERW pipe, are easily rethreaded, and are robust enough for oilfield handling and make-up. As a result, the use of the more rugged 8-round threaded connection with a 2⅜ inches OD non-upset tubing section or a 2⅞ inches OD non-upset tubing section will enable shallow to moderate depth, low flow rate oil and gas wells to be produced much more economically than with the use of existing API tubular connections. Accordingly, the various embodiments of the present invention will allow for more hydrocarbon production in older, more mature reservoirs which are common in the continental U.S.A. and which currently may be uneconomical to produce from.

BRIEF DESCRIPTION OF THE DRAWINGS

The advantages of the present invention will be better understood by referring to the following detailed description and the attached drawings in which.

While the present invention will be described in relation to the preferred embodiments, it will be understood that the invention is not limited thereto. On the contrary, it is intended to cover all alternatives, modifications, and equivalents which may be included within the spirit and scope of the invention, as defined in the appended claims.

DETAILED DESCRIPTION OF THE PREFERRED EMBODIMENTS

Figure 1A:
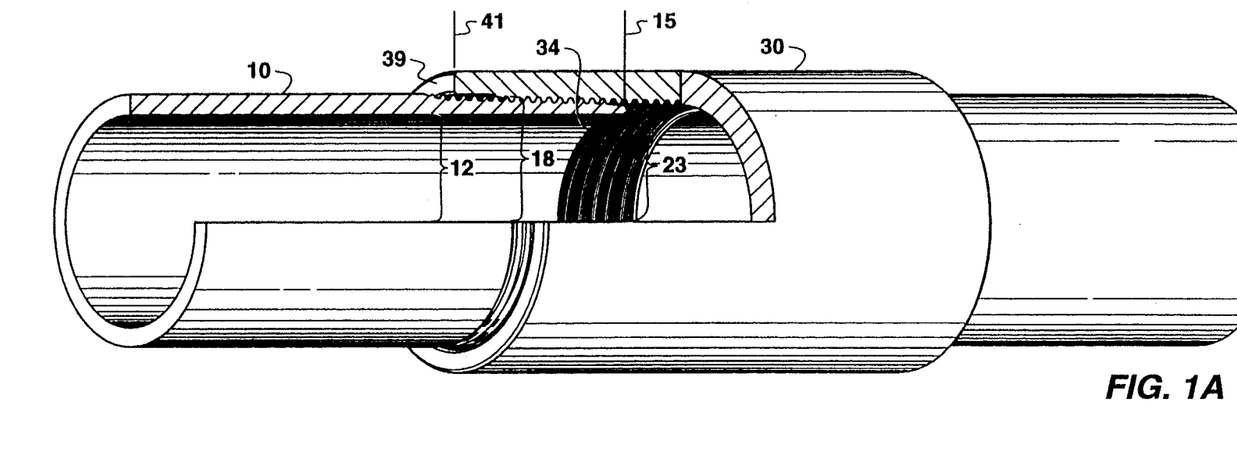
FIGS. 1A and 1B are three-dimensional partial cutaway illustrations of the non-upset tubing section and tubular coupling of the present invention.
Figure 1B:
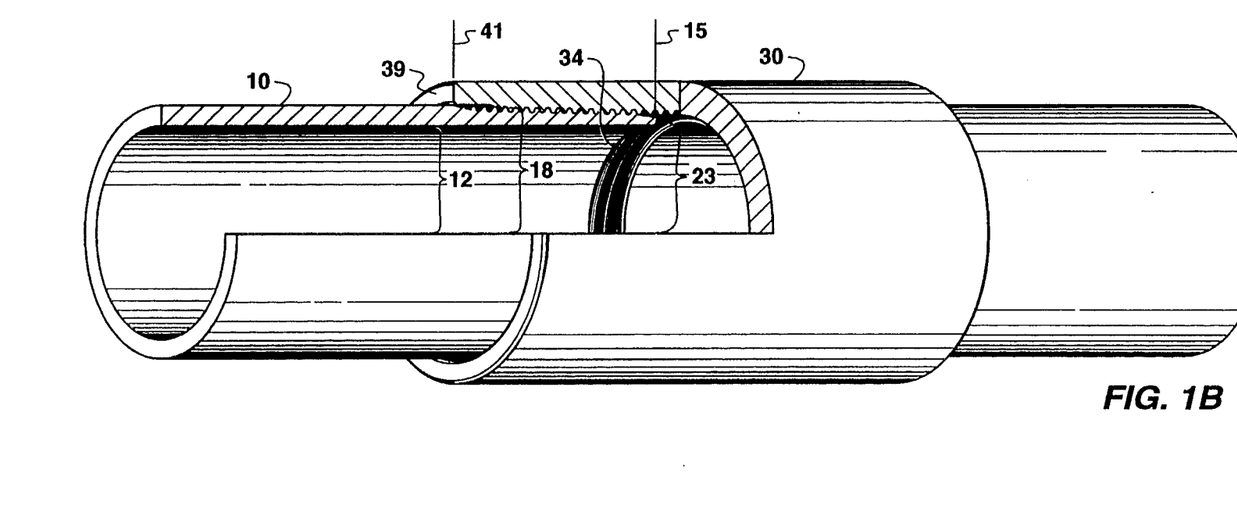

Referring now to the drawings in more detail, FIGS. 1A and 1B are both three-dimensional partial cutaway views of the non-upset tubing section 10 and tubular coupling 30 of the present invention. The two views depict different relative engagements of the pin end 12 of the non-upset tubing section 10 inside the tubular coupling 30; FIG. 1A depicts the connection as the threads (described further below) of the tubing section 10 and the coupling 30 are first engaged, and FIG. 1B depicts the connection in a typical, final, fully made-up condition. When comparing FIGS. 1A and 1B, note the difference in position of the plane 15 located at the end of the pin nose 23 of the tubing section 10 relative to the plane 41 located at a face 39 of the coupling 30.

As shown in FIGS. 1A and 1B, an externally uniformly tapered threaded surface 18 of the non-upset tubing section 10 and an internally uniformly tapered threaded surface 34 of the coupling 30 are shown engaged. Both the externally tapered threaded surface 18 of the non-upset tubing section 10 and the internally tapered threaded surface 34 of the coupling 30 employ approximately eight rounded threads per linear inch. As described briefly above, the "8-round" thread is a standard type of API thread and is described in Table 2.9 and FIG. 2.4 (with tolerances described in Table 2.10) of API Specification STD 5B (Thirteenth Edition, May 31, 1988). It should be noted that the non-upset tubing section 10 can also be referred to as a pipe, a joint of pipe, a tube, a joint of tubing, or a pin. Further, the coupling 30 can also be referred to as a box, or a collar.

The various embodiments of the present invention use the same thread profile and taper as set forth in API STD 5B but apply the profile to different non-upset (rather than upset-end) tubing sizes and utilize different pitch diameters and thread lengths than that practiced under API STD 5B or other existing threading specifications. For example, the various embodiments of the present invention differ significantly from the prior art for pipe threads as shown in American Standard Taper Pipe Thread (ASA B2.1) in *Mark's Standard Handbook for Mechanical Engineers*. This document describes a very slightly truncated threadform with a sharp-edged V-shaped thread profile. Furthermore, the existing thread designs for the pipe sizes of interest are basically intended for surface pipe applications (such as line pipe) and do not have adequate thread length or pin-to-coupling engagement to withstand downhole tensile loads that typically occur due to the vertical position of the pipe in a wellbore (i.e. gravitational weight of a long vertical string). Details of the various embodiments of the non-upset tubing section 10 and the coupling 30 of the present invention are provided below.

Figure 2:
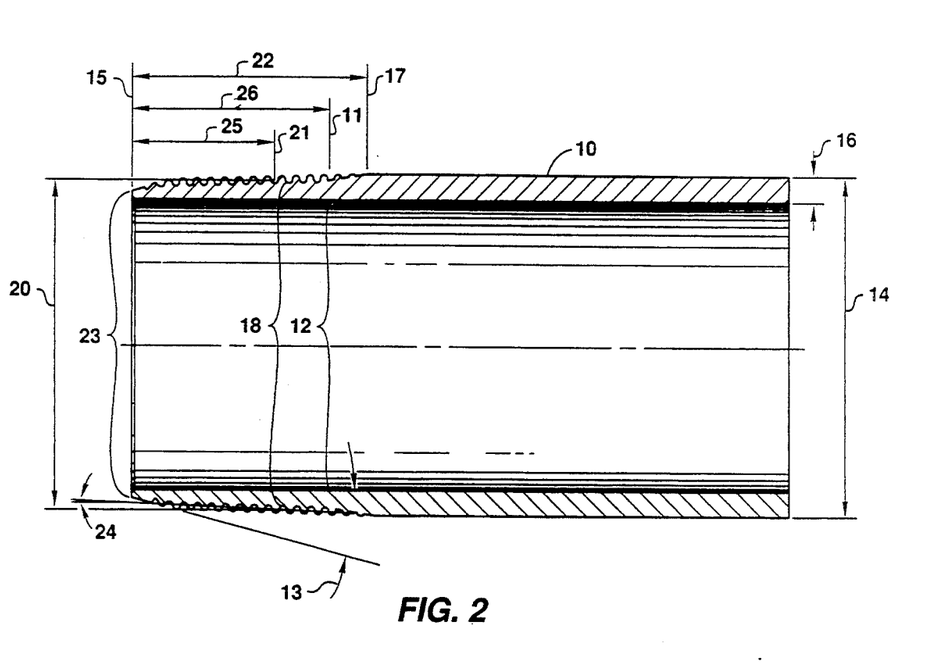
FIG. 2 is a cross-sectional view illustrating the non-upset tubing section of the present invention.

FIG. 2 illustrates in more detail the non-upset tubing section 10 of the present invention. Non-upset tubing section 10 has an outer diameter ("OD") 14 and a pin end 12. In one embodiment, the OD 14 of the non-upset tubing section 10 is preferably about 2⅜ inches (a "2⅜ inches OD tubing section"), and in another embodiment the OD 14 is preferably about 2⅞ inches (a "2⅞ inches OD tubing section"). These OD 14 values can vary by about ±1/32 inches. In addition, the non-upset tubing section 10 has an externally tapered threaded surface 18 with approximately eight rounded threads per linear inch at the pin end 12. The end of the externally tapered threaded surface 18 which has the smallest diameter is referred to as the pin nose 23. The non-upset tubing section 10 can be made of seamless steel tubing, ERW seam steel, or various other materials.

In addition to the foregoing dimensions, in a preferred embodiment, the pitch diameter 20 of the externally tapered threaded surface 18 will be about 2.314 inches for a 2⅜ inches OD tubing section 10 or it will be about 2.771 inches for a 2⅞ inches OD tubing section 10. As shown in FIG. 2, the pitch diameter 20 is measured from the plane 21 located a distance 25 of about 1.250 inches from the plane 15 located at the end of the pin nose 23 for both the 2⅜ inches OD and 2⅞ inches OD tubing section 10. Generally, these pitch diameter 20 values can vary by ±0.008 inches. The distance 25 to the plane 15 is also an important dimension and should be measured to an accuracy of ±0.008 inches.

It should be noted that the pitch diameter 20 is one of the most important dimensions of the present invention and dictates the ease of engagement and the structural and sealing performance of the various embodiments of the present invention. Basically, the pitch diameter 20 is defined as the diametrical distance from the middle of the non-truncated thread to a similar point 180° away, at a plane located at a prescribed distance 25 perpendicular to the axis of the tubing. More theoretically, the pitch diameter 20 is the diameter to an imaginary line drawn through the thread profile such that the width of the thread and groove (or root) are equal. The pitch diameter 20 can be easily measured and verified using conventional oilfield gauges that measure the pitch diameter, such as the Gagemaker MRP ™ or classical master ring and plug gauges similar to those described in API STD 5B.

The vanish point length 22 of the externally tapered threaded surface 18 is preferably about 1.830 inches for the 2⅜ OD tubing section 10 and is about 2.075 inches for the 2⅞ inches OD tubing section 10. These vanish point length 22 values can vary by about ±0.125 inches. Generally, the vanish point length 22 is the distance from the plane 15 located at the end of the pin nose 23 to the plane 17 located at the last remaining outline of the threaded surface 18, commonly termed the "last scratch". The vanish point length 22 is helpful in visually checking the make-up of the connection and can serve as an indication of full thread engagement.

The externally tapered threaded surface 18 will also preferably have a taper angle 24 of about 0.750 inches per foot which can vary by about +0.063 in/ft to −0.031 in/ft. The taper angle 24 is a measure of the uniform change of the pitch diameter of the externally tapered threaded surface 18 over the change of the axial length of the externally tapered threaded surface 18. Further, the effective longitudinal thread length 26 of the externally tapered surface 18 is preferably at least about 1.621 inches (+0.125 inches, −0.000 inches) for the 2⅜ inches OD tubing section 10 and is at least about 1.808 inches (+0.125 inches, −0.000 inches) for the 2⅞ inches OD tubing section 10. The effective longitudinal thread length 26 is the distance from the plane 15 located at the end of the pin nose 23 to the plane 11 located at the last fully-formed thread.

The method of making a non-upset tubing section 10 having an OD 14 of about 2⅜ inches or about 2⅞ inches will comprise the step of fabricating an externally uniformly tapered threaded surface 18 on at least one pin end 12 of the non-upset tubing section 10 such that the externally tapered threaded surface 18 has approximately eight rounded threads per linear inch (±0.024 threads per linear inch). In addition, the method for making the non-upset tubing section 10 preferably includes fabricating the externally tampered threaded surface 18 to have a pitch diameter 20, a vanish point length 22, a taper angle 24, and an effective thread length 26 with the dimensions and corresponding tolerances set forth above.

Conventional techniques and equipment for machining, or cutting, the non-upset tubing section 10 to meet the dimensions and specifications described above can be used. For example, a lathe with a cutting tool that translates axially and that radially engages a rotating pipe to produce the externally tapered threaded surface 18 can be employed to fabricate the non-upset tubing section 10 of the present invention. The cutting tool would have a profile shape that represents an 8-round thread. Further, the pin nose 23 will be externally chamfered (as shown in FIG. 2) at an angle 13 of about 15° (±0.5°) such that the thread root ends, not at the end of the pin nose 23, but in the chamfer; this chamfer aids in allowing easy insertion, or "stabbing", of the pin end 12 into the coupling 30 when first making-up the connection (i.e. pin 10 and coupling 30 engaged) in the field. The chamfer angle 13 is important in conjunction with the aforestated dimensions in generating a sufficiently robust area at the pin nose 23; the chamfer is designed to leave a sufficient thickness at the end of the pin nose 23 to allow for moderate axial impact loads, such as from pipe handling, without damage. The cutting tool is normally a harder material (such as carbide or hardened tool steel) than the pipe or tubing and is readily available in the industry. The lathe machines can be set up manually. In addition, sophisticated computer numerically-controlled (CNC) lathes can be used by programming the machine using the aforementioned dimensional data. Both types of lathes (manual and CNC) as well as the cutting tools are well known to oilfield equipment suppliers. The only requirements to manufacture or fabricate the various embodiments of the non-upset tubing section 10 of the present invention are the dimensions and key tolerances that describe the external threads.

Figure 3:
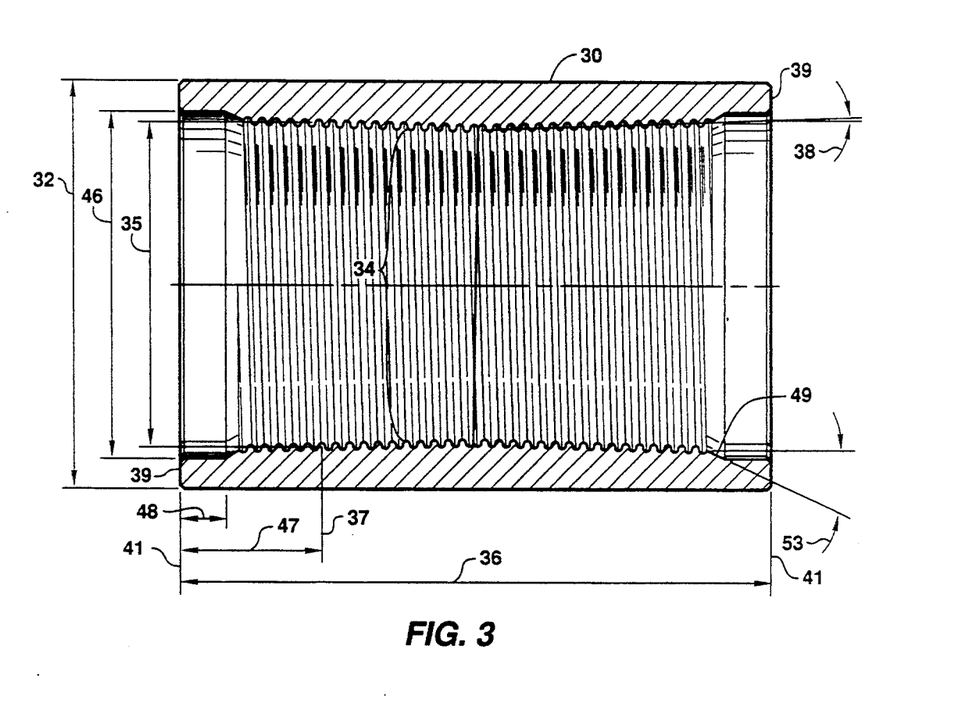
FIG. 3 is a cross-sectional view illustrating the tubular coupling of the present invention.

FIG. 3 illustrates the tubular coupling 30 of the present invention. The coupling 30 preferably has an OD 32 of about $2\frac{7}{8}$ inches (±1/32 inches)(the "$2\frac{7}{8}$ inches OD coupling"), which can be used when connecting $2\frac{3}{8}$ inches OD tubing section 10, or about $3\frac{1}{2}$ inches (±1/32 inches)(the "$3\frac{1}{2}$ inches OD coupling") which can be used when connecting $2\frac{7}{8}$ inches OD tubing section 10. The coupling 30 also has an internally uniformly tapered threaded surface 34 which has approximately eight rounded threads per linear inch (±0.024 threads per linear inch tolerance). The internally tapered threaded surface 34 will preferably have a pitch diameter 35 of about 2.258 inches, for use with the $2\frac{3}{8}$ inches OD tubing section 10, or about 2.729 inches for use with the $2\frac{7}{8}$ inches OD tubing section 10, where the coupling pitch diameter 35 is measured from a plane 37 located a distance 47 of about 1.250 inches from a plane 41 located at a face 39 of the coupling 30. As previously stated for the tubing section 10, the pitch diameter 35 and the distance 47 to the plane 37 are important dimensions, each having a tolerance of ±0.008 inches. The ends of the coupling 30 that have the largest bore are referred to as the faces 39 of the coupling 30.

To allow for full engagement of the pin-end 12 of the tubing section 10 when fully made-up with the coupling 30, the length 36 of the coupling 30 is preferably at least about $4\frac{3}{4}$ inches for use with a $2\frac{3}{8}$ inches OD tubing section 10 and about $5\frac{1}{8}$ inches for use with a $2\frac{7}{8}$ inches OD tubing section 10. The length 36 of the coupling 30 has a tolerance of $+\frac{1}{8}$ inches and −0 inches. The internally tapered threaded surface 34 will preferably have a taper angle 38 of about 0.750 inch per foot which can vary by +0.063 in/ft and −0.031 in/ft.

The coupling 30 will preferably have a recess diameter 46 of about 2.466 inches, for use with a $2\frac{3}{8}$ inches OD tubing section 10, or about 2.938 inches, for use with a $2\frac{7}{8}$ inches OD tubing section 10, and will have a recess depth 48 of about 0.365 inches for use with a $2\frac{3}{8}$ inches OD tubing section 10 and about 0.388 inches for use with a $2\frac{7}{8}$ inches OD tubing section 10. Generally, the recess diameter 46 aids in "stabbing" the pin end 12 of the tubing section 10 into the coupling 30 prior to making up the connection, and the recess depth 48 is the measurement from the coupling face 39 to the start of the chamfer 49. The chamfer 49 has an angle 53 of about 15° (±0.5°) and helps ensure that the threads engage smoothly at the start of make-up. The coupling 30 can be made of seamless steel or various other materials.

The method for making a tubular coupling 30 for use with at least one non-upset tubing section 10 is described further below. For a tubular coupling 30 having an OD 32 of about $2\frac{7}{8}$ inches (for use with at least one $2\frac{3}{8}$ inches OD tubing section 10) or an OD of about $3\frac{1}{2}$ inches (for use with at least one $2\frac{7}{8}$ inches OD tubing section 10), the method will include the step of fabricating an internally tapered threaded surface 34 within the tubular coupling 30, such that the internally tapered threaded surface 34 has approximately eight rounded threads per linear inch. The internally tapered threaded surface 34 will preferably also be fabricated to have a pitch diameter 35 of about 2.258 inches for use with a $2\frac{3}{8}$ inches OD tubing section 10 or about 2.729 inches for use with the $2\frac{7}{8}$ inches OD tubing section 10. The tolerances for the coupling pitch diameter 35 is about ±0.008 inches. There are two pitch diameters 35 per coupling 30, both of which are measured at a plane 37 located about 1.250 inches from each coupling face 39. As with the tubing pitch diameter 20, the coupling pitch diameter 35 can easily be measured and verified using conventional oilfield gauges. In addition, the internally tapered threaded surface 34 is preferably fabricated to have a taper angle 38 of about 0.750 inches per foot which can vary by 0.063 in/ft and −0.031 in/ft. As with the non-upset tubing section 10, the coupling 30 can be fabricated to meet the specifications set forth above using techniques and equipment well known to those skilled in the art.

The method for connecting the non-upset tubing section(s) 10 and the coupling 30 consists of applying a thread compound or lubricant to the externally tapered threaded surface 18 of the pin end 12 of the tubing section 10 and/or to the internally tapered threaded surface 34 of the coupling 30. The pin end 12 of at least one non-upset tubing section 10 is then inserted into one end of the tubular coupling 30, and the tubing section 10, or the coupling 30, is turned or rotated relative to its mating part to a point such that the connection is made-up to reliably seal and connect the tubing section 10 with the tubular coupling 30. The tubing section 10, or coupling 30, can be turned or rotated relative to the mating part (i.e. coupling 30 or tubing section 10, respectively) manually or preferably with a hydraulic torque wrench, such as a set of oilfield-type power tongs or a buck-on machine.

The various embodiments of the present invention rely on the threads as the load-bearing mechanism to carry axial loads from compression, tension, and/or bending and also to seal internal and external pressure, all of which are frequently encountered in the oilfield.

As discussed above, to help improve the efficiency of the connection, a lubricant (also known as a thread compound) is employed. This lubricant can be a wide variety of products such as those described in API Bulletin 5A2 or other similar products that have a lubricating base combined with small malleable particles. The application of a lubricant to the threaded surface(s) is standard practice for oilfield tubular connections. Tests conducted indicate that the composition and quantity of the thread compound is far less important than the thread geometry and make-up parameters (namely torque and final position engagement of the tubing section 10 relative to the coupling 30) for an 8-round thread form in the sizes described in the various embodiments of the present invention. A wide variety of commercially-available API and non-API thread compounds have been tested and were found to work satisfactorily for the 8-round thread form as is employed in the various embodiments of the present invention.

There are several common methods for making-up threaded and coupled connections. Generally, the various embodiments of the connection described in the present invention are considered to be "interference connections". As a connection is made up, the pin end 12 of the tubing section 10 becomes wedged into the coupling 30, creating bearing or contact pressures. It is this bearing pressure along with the effects of the thread compound which acts as a sealing mechanism. More specifically, there are three different methods that can be used to make-up the connection. The connection can be made-up by (a) applying torque to a prescribed level which is measured with a torque gauge, or by (b) monitoring the axial engagement of the pin end 12 relative to the coupling face 39 until a prescribed amount of thread engagement is achieved, or (c) by a method known as the "torque-position" method, which utilizes a combination of a prescribed range of make-up torques with a range of axial positions.

With the various embodiments of the present invention, it is preferable that the torque-position method set forth in U.S. Pat. No. 4,962,579, (issued to Exxon Production Research Company), be used to determine when the tubing section 10 and the coupling 30 have been made-up enough to ensure reliable sealing. This is a quality-control method which is useful in assuring sealability, tensile strength, and reusability of the tubing section 10 and coupling 30. Generally, the make-up procedure is as follows: a position window is painted near the pin end 12 of the tubing section 10 at a prescribed distance from the plane 15 located at the end of the pin nose 23. This position window can be painted on using spray paint and a precision-made stainless steel template. Thread compound is then applied to the externally threaded tapered surface 18 of the pin end 12 and/or the internally tapered threaded surface 34 of the coupling 30, and the connection is made-up with a set of power tongs or a buck-on machine. The connection should be made-up such that the prescribed torque and position requirements are satisfied.

If the coupling face 39 advances into the position window within the prescribed torque range, then the connection is judged to be acceptable. If the coupling face 39 falls short of the position window at the prescribed maxime torque, then the connection is rejected. This situation is typically caused by galling, cross-threading, or engagement of an oversized pin end 12 with an undersized coupling 30. If the coupling face 39 progresses past the position window below the prescribed minimum torque, the connection is rejected because the connection performance would be compromised. This typically occurs when the pin end 12 is undersized and/or the coupling 30 is oversized. The net result of exceeding the position window at low torque can be inadequate thread interference and/or interference with the opposing tubing section pin or runout threads.

This method can be easily verified by field personnel since the position window is visible and a torque record is usually available. Although the application of the method is quite easy to use, development of the torque range and the position window's width and its placement are relatively complex. Further details can be found in the referenced patent.

Other methods for determining when the non-upset tubing section 10 or the coupling 30 have been turned (or engaged) enough to ensure that the non-upset tubing section 10 and the coupling 30 reliably connect and seal are well known to those skilled in the art. These methods for making-up the threaded connection include the torque-only method and the position-only method. As discussed previously, with the torque-only method, proper make-up of the connection is achieved by applying torque to a prescribed minimum torque. With the position-only method, the tubing section 10 or the coupling 30 is turned until the last thread of the pin end 12 can no longer be seen. These techniques may be acceptable if quality control of the threads is not an issue or if the downhole service conditions are particularly mild.

A preferred embodiment for the 2⅜ inches OD tubing section 10 for use with a 2⅞ inches OD coupling is set forth in Table I below. And a preferred embodiment for the 2⅞ inches OD tubing section 10 for use with a 3½ inches OD coupling are set forth in Table II below. In each embodiment, steel with a minimum yield strength of 55,000 pounds per square inch (also known as "J-55" grade) is preferably used for both the tubing section 10 and the coupling 30. Furthermore, the preferred wall thickness 16 application is 0.190 inches (also known as 4.6 lb/ft nominal weight) for the 2⅜ inches OD tubing section and 0.217 inches (also known as 6.4 lb/ft nominal weight) for the 2⅞ inches OD tubing section.

Because the pitch diameter (PD) is so critical to the performance of the connection, the plane it is measured at is also critical. This plane (21 for tubing section 10 and 37 for coupling 30) should be measured at a tolerance of ±0.008 inches in the axial direction. For both Tables I and II, the taper angle (24 for tubing 10 and 38 for coupling 30) on each threaded surface is 0.750 in/ft (+0.063 in/ft, −0.031 in/ft) (uniform change of the pitch diameter of the threaded surface/change of the axial length of the threaded surface).

TABLE I

| | | (units of inches) | | |
|---|---|---|---|---|
| Pin: Outer Diameter (14) | Pin: Distance to Measure Pitch Diameter (25) | Pin: Pitch Diameter of Threads (20) | Pin: Effective Thread Length (26) | Pin: Vanish Point Length (22) |
| 2⅜ (±1/32) | 1.250 (±0.008) | 2.314 (±0.008) | 1.621 (+0.125) (−0.000) | 1.830 (±0.125) |
| Coupling: Outer | Coupling: Distance to Measure Pitch | Coupling: Pitch Diameter | Coupling: Recess | Coupling: Recess | Coupling: |

TABLE I-continued (units of inches)

| Diameter (32) | Diameter (47) | of Threads (35) | Diameter (46) | Depth (48) | Length (36) |
|---|---|---|---|---|---|
| 2⅞ (±1/32) | 1.250 (±0.008) | 2.258 (±0.008) | 2.466 (+0.030) (−0.000) | 0.365 (±0.030) | 4¾ (+⅛) (−0) |

TABLE II (units of inches)

| Pin: Outer Diameter (14) | Pin: Distance to Measure Pitch Diameter (25) | Pin: Pitch Diameter of Threads (20) | Pin: Effective Thread Length (26) | Pin: Vanish Point Length (22) |
|---|---|---|---|---|
| 2⅞ (±1/32) | 1.250 (±0.008) | 2.771 (±0.008) | 1.808 (+0.125) (−0.000) | 2.075 (±0.125) |

| Coupling: Outer Diameter (32) | Coupling: Distance to Measure Pitch Diameter (47) | Coupling: Pitch Diameter of Threads (35) | Coupling: Recess Diameter (46) | Coupling: Recess Depth (48) | Coupling: Length (36) |
|---|---|---|---|---|---|
| 3½ (±1/32) | 1.250 (±0.008) | 2.729 (±0.008) | 2.938 (+0.030) (−0.000) | 0.388 (±0.030) | 5⅛ (+⅛) (−0) |

EXAMPLE

To determine if the dimensions and tolerances set forth in Tables I and II above are operable, finite element models of the connection geometries were created. The primary purpose of this modeling was to ascertain whether the design was feasible, before proceeding with costly and time-consuming full-scale tests. Advanced non-linear finite element analysis was used to simulate realistic make-up conditions and tensile and pressure loads. Different make-up conditions were applied until the analysis indicated that the bearing pressure of the mating pin and box threads was sufficient to resist leakage. The models' stress and strain levels in the connection were observed under simulated tensile and pressure loads to measure the connection performance under design conditions. In addition, the connection performance was modeled under worst-case tolerance conditions for a pressure seal, which consisted primarily of modeling the external pin threads with the highest (or most positive) taper tolerance engaged with the internal coupling threads with the lowest (or most negative) taper tolerance.

The above described analyses for the threaded connections indicated reliable connection performance and therefore enabled the amount of full-scale testing to be minimized. Based on these modeling analyses, full-scale combined load tests were conducted. Both liquid (a light oil) and gas (nitrogen) were used as pressurizing fluid. Sealability was confirmed using video monitors, pressure gauges, and gas bubble detectors.

Experimentation with full-size threaded connections on 2⅞ inches OD pipe confirmed the finite element model predictions and verified the performance of the design. The present dimensions were used to machine a thread form into tubing sections of a preferred embodiment, that is, 2⅞ inches OD tubing section, 55,000 psi minimum yield strength (J-55 material), 0.217 inch nominal wall thickness (6.4 lb/ft nominal weight), and to fabricate a coupling member with 3½ inches OD with the threaded surface from 55,000 psi minimum yield strength material. The coupling thread surface was phosphatized which improves the make-up characteristics of the connection and is a common oilfield metallurgical surface treatment. It is anticipated that other common surface treatments such as electroplated zinc or tin or even a light surface blasting process would be acceptable. The pin section was made-up into the coupling section to an engagement of 2.104 inches, measured from the plane of the pin nose to the plane of the coupling face, using an applied torque of about 1500 ft-lbs. The other side of the coupling section had another pin section made-up into the coupling section to an engagement of 2.163 inches measured from the plane of the second pin nose to the plane of the second coupling face, using an applied torque of about 1475 ft-lbs. The connection thus made-up was subjected to a combined internal pressure of 6600 lbs. per square inch (psi) of nitrogen gas and a total tensile force of 50,000 lbs. while maintained at a temperature of 300° F. No escape of internal pressure was noted while holding this load for 10 minutes, nor during 120 minutes holding various lesser load combinations.

This full-scale connection testing has also been repeated on several other 2⅞ inches OD tubing and 3½ inches OD coupling specimens machined with the present thread designs, and the testing has indicated that a reliable seal can be formed when making up this connection. However, as is well known to those skilled in the art, other variables such as improper make-up, unknown downhole loads, formation subsidence, vibrations, corrosion, etc., may affect (and diminish) connection performance and therefore, special care must be taken in handling and making-up any downhole tubular connection to assure a reliable seal. In addition to various sealability tests, several connection specimens were loaded to failure by applying increased tension or internal pressure loads. The tensile load required to fracture the pipe under the last thread varied from approximately 103,000 lbs to 126,000 lbs. The internal pressure required to burst the pipe body was approximately 13,800 pounds per square inch, and no connection leaks were noted prior to burst failure.

As described and illustrated herein, the present invention satisfies the need for a rugged, low-cost tubing connection for use with non-upset tubing having an outer diameter of about 2⅜ inches or about 2⅞ inches, which incorporates the widely accepted benefits of an 8-round thread form and does not have the problems and increased costs associated with upset-end tubing connections. It should be understood that the invention is not to be unduly limited to the foregoing which has been set forth for illustrative purposes. Various alterations and modifications of the invention will be apparent to those skilled in the art without departing from the true scope of the invention, as defined in the following claims.

What we claim is:

1. A non-upset tubing section having an outer diameter of about 2⅜ inches and a pin end with an externally tapered threaded surface; said externally tapered threaded surface having approximately eight API rounded threads per linear inch: said threads having a thread form in accordance with API Specification Std. 5B, Table 2.9 and FIG. 2.4 (13th ed. May 31, 1988), and a pitch diameter of about 2.314 inches; said pitch diameter measured at a plane located about 1.250 inches from a plane located at the end of the nose of said pin end.

2. The non-upset tubing section of claim 1 wherein the vanish point length of said externally tapered threaded surface is about 1.83 inches; said vanish point length measured from a plane located at the end of the pin nose to the last trace of the thread form.

3. The non-upset tubing section of claim 1 wherein said externally tapered threaded surface has an effective longitudinal thread length of at least about 1.62 inches; said thread length measured from a plane located at the end of said pin nose to the last fully formed thread of said threaded surface.

4. A non-upset tubing section having an outer diameter of about 2⅜ inches and a pin end with an externally tapered threaded surface; said externally tapered threaded surface having approximately eight API rounded threads per linear inch: said threads having a thread form in accordance with API Specification Std. 5B, Table 2.9 and FIG. 2.4 (13th ed. May 31, 1988), and a pitch diameter of about 2.771 inches; said pitch diameter measured from a plane located about 1.250 inches from a plane located at the end of the nose of said pin end.

5. The non-upset tubing section of claim 4 wherein the vanish point length of said externally tapered threaded surface is about 2.08 inches; said vanish point length measured from a plane located at the end of said pin nose to the last trace of the thread form.

6. The non-upset tubing section of claim 4 wherein said externally tapered threaded surface has an effective longitudinal thread length of at least about 1.81 inches; said thread length measured from a plane located at the end of said pin nose to the last fully formed thread of said threaded surface.

7. A tubular coupling for use with at least one non-upset tubing section having an outer diameter of about 2⅜ inches; said tubular coupling having an outer diameter of about 2⅞ inches and an internally tapered threaded surface; said internally tapered threaded surface having approximately eight API rounded threads per linear inch: said threads having a thread form in accordance with API Specification Std, 5B, Table 2.9 and FIG. 2.4 (13th ed. May 31, 1988), and a pitch diameter of about 2.258 inches; said pitch diameter measured at a plane located about 1.250 inches from a plane located at a face of said tubular coupling.

8. The tubular coupling of claim 7 having a length which is at least about 4¾ inches.

9. The tubular coupling of claim 7 having a recess diameter of about 2.47 inches.

10. The tubular coupling of claim 7 having a recess depth of about 0.36 inches, said recess depth measured from a plane located at said coupling face to the start of the chamfer of said coupling.

11. A tubular coupling for use with at least one tubing section having an outer diameter of about 2⅞ inches; said tubular coupling having an outer diameter of about 3½ inches and an internally tapered threaded surface; said internally tapered threaded surface having approximately eight API rounded threads per linear inch: said threads having a thread form in accordance with API Specification Std. 5B. Table 2.9 and FIG. 2.4 (13th ed. May 31, 1988), and a pitch diameter of about 2.729 inches; said pitch diameter measured at a plane located about 1.250 inches from a plane located at a face of said tubular coupling.

12. The tubular coupling of claim 11 having a length which is at least about 5⅛ inches.

13. The tubular coupling of claim 11 having a recess diameter of about 2.94 inches.

14. The tubular coupling of claim 11 having a recess depth of about 0.39 inches, said recess depth measured from the plane located at said coupling face to the start of the chamfer of said coupling.

15. A connection for non-upset tubing sections comprising;
(a) at least one non-upset tubing section having an outer diameter of about 2⅜ inches and at least one pin end; said pin end having an externally tapered threaded surface with approximately eight API rounded threads per linear inch: said threads having a thread form in accordance with API Specification Std. 5B, Table 2.9 and FIG. 2.4 (13th ed. May 31, 1988), and a pitch diameter of about 2.314 inches; said pitch diameter measured at a plane located about 1.250 inches from a plane located at the end of the nose of said pin end; and
(b) one tubular coupling having an outer diameter of about 2⅞ inches and having two box ends; each of said box ends having an internally tapered threaded surface with approximately eight API rounded threads per linear inch: said threads having a thread form in accordance with API Specification Std. 5B, Table 2.9 and FIG. 2.4 (13th ed. May 31, 1988), and having a pitch diameter of about 2.258 inches; said pitch diameter measured at a plane located about 1.250 inches from a face of said tubular coupling; said tubular coupling for mating at either box-end with said externally tapered threaded surface of said pin end of said non-upset tubing section.

16. The connection of claim 15 wherein said threaded surface of said pin end of said non-upset tubing section has an effective longitudinal thread length of at least about 1.62 inches; said thread length measured from a plane located at the end of said pin nose.

17. The connection of claim 15 wherein the vanish point length of said externally tapered threaded surface of said pin end is about 1.83 inches; said vanish point length measured from a plane located at the end of said pin nose to the last trace of the thread form.

18. The connection of claim 15 wherein the length of said tubular coupling is at least about 4¾ inches.

19. The connection of claim 15 wherein said tubular coupling has a recess diameter of at least about 2.47 inches.

20. The connection of claim 15 wherein said tubular coupling has a recess depth of about 0.36 inches.

21. A connection for non-upset tubing sections comprising;
(a) at least one non-upset tubing section having an outer diameter of about 2⅞ inches and at least one pin end; said pin end having an externally tapered threaded surface with approximately eight API rounded threads per linear inch; said threads having a thread form in accordance with API Specification Std. 5B, Table 2.9 and FIG. 2.4 (13th ed. May 31, 1988), and a pitch diameter of about 2.771 inches; said pitch diameter measured from a plane located about 1.250 inches from a plane located at the end of the nose of said pin end; and
(b) one tubular coupling having an outer diameter of about 3½ inches and having two box ends; each of said box ends having an internally tapered threaded surface with approximately eight API rounded threads per linear inch: said threads having a thread form in accordance with API Specification Std. 5B, Table 2.9 and FIG. 2.4 (13th ed. May 31, 1988), and a pitch diameter of about 2.729 inches; said pitch diameter measured at a plane located about 1.250 inches from a face of said tubular coupling; said tubular coupling for mating at either box-end with said externally tapered threaded surface of said pin end of said non-upset tubing section.

22. The connection of claim 21 wherein said threaded surface of said pin end of said non-upset tubing section has an effective longitudinal thread length of at least about 1.81 inches; said thread length measured from a plane located at the end of said pin nose.

23. The connection of claim 21 wherein the vanish point length of said externally tapered threaded surface of said pin end is about 2.08 inches; said vanish point length measured from a plane located at the end of said pin nose to the last trace of the thread form.

24. The connection of claim 21 wherein the length of said tubular coupling is at least about $5\frac{1}{8}$ inches.

25. The connection of claim 21 wherein said tubular coupling has a recess diameter of at least about 2.94 inches.

26. The connection of claim 21 wherein said tubular coupling has a recess depth of about 0.39 inches.

* * * * *